US008175145B2

(12) United States Patent
Garcia et al.

(10) Patent No.: US 8,175,145 B2
(45) Date of Patent: May 8, 2012

(54) POST-PROCESSING FOR REDUCING QUANTIZATION NOISE OF AN ENCODER DURING DECODING

(75) Inventors: Jean-Luc Garcia, Issy les Moulineaux (FR); Claude Marro, Plouguiel (FR); Balazs Kovesi, Lannion (FR)

(73) Assignee: France Telecom, Paris (FR)

( * ) Notice: Subject to any disclaimer, the term of this patent is extended or adjusted under 35 U.S.C. 154(b) by 337 days.

(21) Appl. No.: 12/663,546

(22) PCT Filed: Jun. 13, 2008

(86) PCT No.: PCT/FR2008/051057

§ 371 (c)(1), (2), (4) Date: Dec. 8, 2009

(87) PCT Pub. No.: WO2009/004225

PCT Pub. Date: Jan. 8, 2009

(65) Prior Publication Data

US 2010/0183067 A1 Jul. 22, 2010

(30) Foreign Application Priority Data

Jun. 14, 2007 (FR) ..................................... 07 04242

(51) Int. Cl.
*H04B 1/66* (2006.01)

(52) U.S. Cl. ........ 375/240; 375/243; 375/242; 375/245; 375/254; 704/230; 704/503; 704/200; 704/500

(58) Field of Classification Search .................. 375/240, 375/243, 242, 245, 254; 704/230, 503, 200, 704/500

See application file for complete search history.

(56) References Cited

U.S. PATENT DOCUMENTS

| | | | | |
|---|---|---|---|---|
| 6,058,362 | A * | 5/2000 | Malvar | 704/230 |
| 6,128,346 | A * | 10/2000 | Suarez et al. | 375/254 |
| 6,738,428 | B1 * | 5/2004 | Nagatomo | 375/244 |
| 2003/0182104 | A1 | 9/2003 | Muesch | |
| 2005/0117656 | A1 * | 6/2005 | Gigi | 375/245 |
| 2006/0116874 | A1 * | 6/2006 | Samuelsson et al. | 704/228 |

FOREIGN PATENT DOCUMENTS

WO WO 2005/041170 A1 5/2005

OTHER PUBLICATIONS

Chen et al., "Adaptive Postfiltering for Quality Enhancement of Coded Speech," IEEE Transactions on Speech and Audio Processing, vol. 3 (1), pp. 59-71 (Jan. 1995).

* cited by examiner

*Primary Examiner* — Phuong Phu

(74) *Attorney, Agent, or Firm* — Drinker Biddle & Reath LLP

(57) ABSTRACT

The invention relates to the processing of a signal that is compression encoded (COD) according to a predetermined encoding type applying a quantification operation (Q) and then decoded (DEC) so that the quantification noise is present in the decoded signal (S*). The signal processing of the invention comprises applying a quantification noise reduction (TBQ) to the decoded signal (S), preferably in the following manner: first obtaining information (INF) on the type of compression encoding, selecting a model for the reduction of the quantification noise adapted to said information by estimating the quantification noise (BQ) that the encoding may have generated; and applying to the decoded signal (S*) a processing for reducing the quantification noise (FIL) according to the selected model.

11 Claims, 5 Drawing Sheets

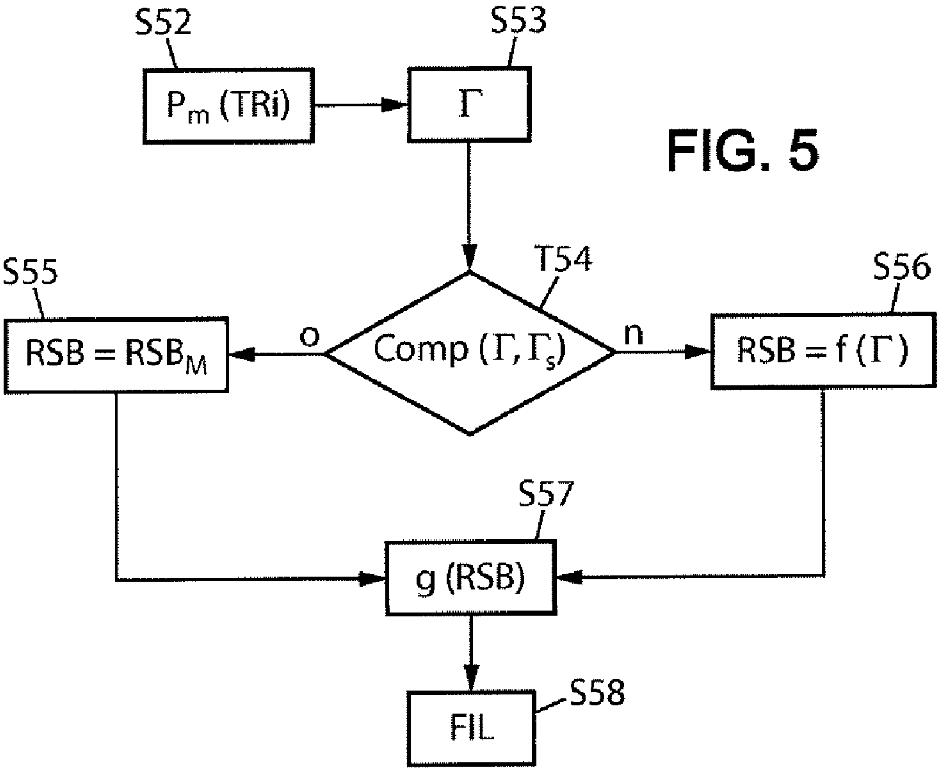
FIG. 5
FIG. 6
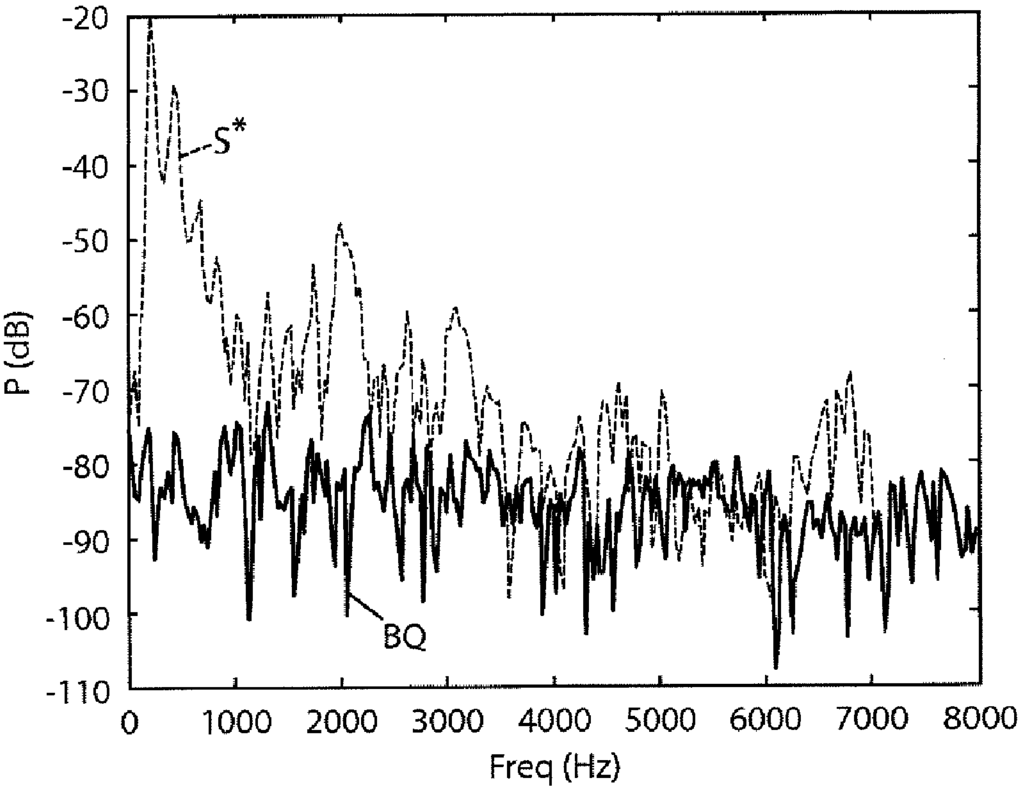

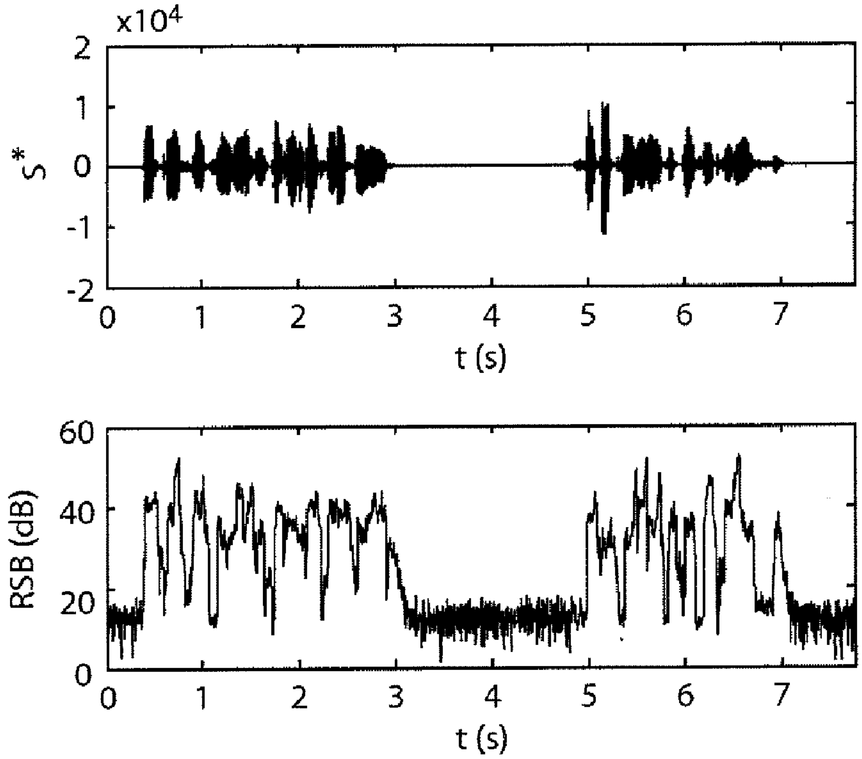
FIG. 7
FIG. 8
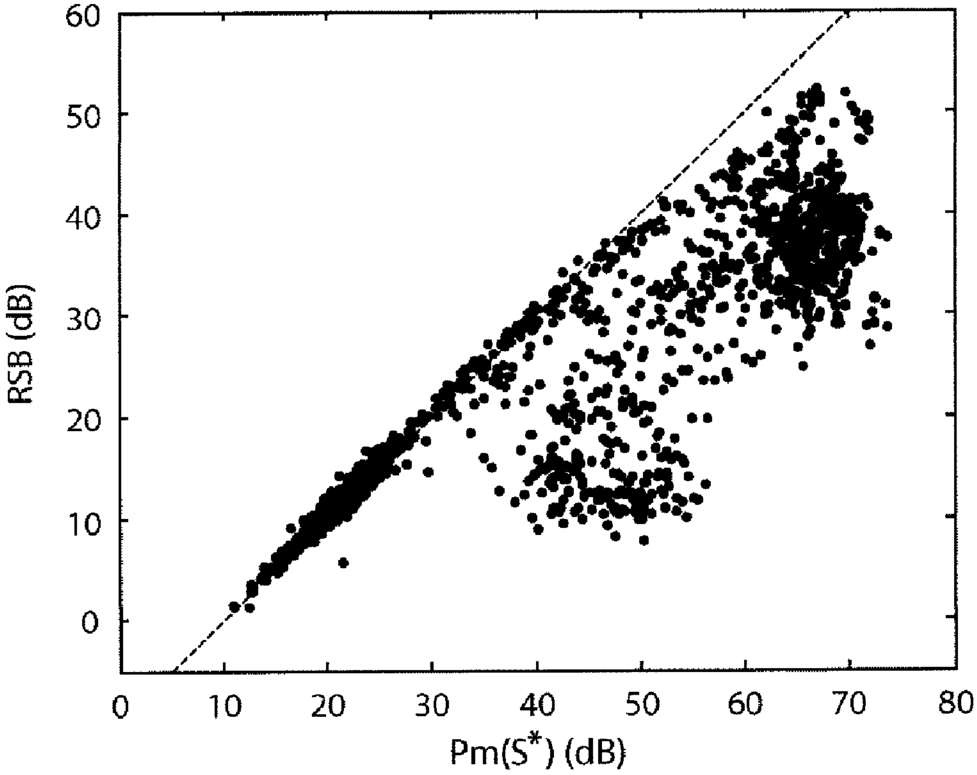

POST-PROCESSING FOR REDUCING QUANTIZATION NOISE OF AN ENCODER DURING DECODING

CROSS-REFERENCE TO RELATED APPLICATIONS

This application is the U.S. national phase of the International Patent Application No. PCT/FR2008/051057 filed Jun. 13, 2008, which claims the benefit of French Application No. 07 04242 filed Jun. 14, 2007, the entire content of which is incorporated herein by reference.

FIELD OF THE INVENTION

The present invention relates to a signal processing, in particular of digital signals in the telecommunications field, these signals being able, for example, to be speech, music, video or other signals.

BACKGROUND OF THE INVENTION

Usually, the bit rate necessary to transmit an audio and/or video signal with sufficient quality is an important parameter in telecommunications. In order to reduce this parameter and then to increase the number of communications possible via one and the same network, audio encoders have been developed in particular to compress the quantity of information necessary to transmit a signal.

Certain encoders make it possible to achieve particularly high ratios of compression of the information. Such encoders usually use advanced techniques for modeling and quantizing the information. Therefore, such encoders transmit only models or partial data of the signal.

The decoded signal, although it is not identical to the original signal (since a portion of the information has not been transmitted because of the quantization operation), nevertheless remains very similar to the original signal. The difference, from the mathematical point of view, between the decoded signal and the original signal is then called "quantization noise". It is also possible to speak of "distortion" introduced by encoding decoding.

The compression processes of signals are often designed so as to minimize the quantization noise and, in particular, to make this quantization noise as inaudible as possible when it involves processing an audio signal. There are therefore techniques taking account of the psycho-acoustic characteristics of hearing, for the purpose of "masking" this noise. However, to obtain the lowest possible bit rates, the noise may remain audible, on occasions, which, in certain circumstances, degrades the intelligibility of the signal.

In order to reduce this noise, two families of techniques are usually used.

It is possible, first of all, to use a perceptual postfilter, of the type used for example in the speech decoders of CELP (for "Coded Excited Linear Prediction") type. This involves filtering which improves the subjective quality at the price of distortion. Specifically, an attenuation of the signal is applied in the zones in which the quantization noise is the most audible (particularly between the formants). Current perceptual postfilters provide good results for speech signals, but less good results for other types of signals (music signals, for example).

Specifically, a postfilter for improving encoded speech is described in particular in the document by Chen et al.:

"*Adaptive Postfiltering for Quality Enhancement of Coded Speech*", Chen J. H., Gersho A., IEEE Trans. On Speech and Audio Proc., (January 1995).

The model described is based on a division into two sections:

- a "long term" section reinforces the harmonics (harmonics of the fundamental frequency) and hollows out the spectral valleys between these harmonics, and
- a "short term" section reinforces the formants and also hollows out the spectral valleys between these formants.

Harmonics and formants are well known spectral characteristics of speech but to apply this type of process to a signal other than speech generates great distortions. For example, the spectral richness of a music signal cannot be processed with such a simple signal model.

Therefore, perceptual postfilters can generate distortions because they are based on a model which is not precise enough. Moreover, the perceptual postfilter is usually ineffective in periods of silence. These problems were able to be observed experimentally by the Applicant which initially sought to incorporate this type of perceptual postfilter in decoders that are not of the CELP type, for example in decoders within the meaning of the G.711 standard or the G.722 standard.

Another processing family aims at conventional noise-reduction processes in order to distinguish the effective signal from the spurious noise. This type of process therefore makes it possible to reduce the noise associated with the environment of signal capture and it is often used for speech signals. However, in this instance, it is impossible to make the process transparent with respect to the noise associated with the sound pick-up environment, which poses a problem for the encoding of a music signal in particular. Therefore, in encoding/decoding it is possible to want to transmit the ambient noise and it is then desirable that the noise reduction does not apply to this type of noise.

The present invention enhances the situation.

SUMMARY OF THE INVENTION

Accordingly it proposes a method for processing a signal that has been compression encoded according to a predetermined encoding type, applying a quantization operation, then decoded.

The method with respect to the invention comprises:

- an estimate of a quantization noise introduced by the compression encoding based on the decoded signal and information obtained a priori on the type of compression encoding,
- an estimate of a signal to quantization noise rate. and
- a determination, based on the estimated signal to quantization noise rate, of a filtering function to be applied to the decoded signal in order to apply an estimated quantization noise reduction process.

The term "noise-reduction process" means in this instance an operation of the type described above which consists in extracting the effective signal from a signal to be processed, filtering the spurious signals, for example by defining a gain function operating in a filter applied to the decoded signal. In this instance, the quantization noise is filtered in this way.

It is a matter therefore of conventional noise reduction but applied in this instance in order to reduce the quantization noise. This noise reduction is in no way similar to a perceptual postfilter of the type described in Chen et al., which is based totally on the characteristics and the dynamic of the signal, while the noise-reduction process within the context of the invention is rather based on the determination of the quantization noise.

In a preferred embodiment:

a quantization noise reduction model is chosen based on information on the type of compression encoding, and a quantization noise reduction process is applied to the decoded signal according to the chosen model.

More particularly, once the model has been chosen, preferably:

on the basis of this model, the quantization noise that the compression encoding has introduced is estimated, and based on the estimated quantization noise, a filtering function (and in particular the parameters of this filtering function) is determined to be applied to the decoded signal in order to apply the quantization noise reduction process.

Therefore, a noise-reduction process type specific to each type of compression encoding carried out is provided. The very manner of estimating the characteristics of the noise-reduction filter (type of gain function, parameters of the gain function, etc.) depends on the type of encoding carried out.

It will be seen in particular in the exemplary embodiments given below that the quantization noise itself depends heavily on the type of encoding carried out. It will be seen that it is possible to establish a variation of the quantization noise as a function of a variation of the decoded signal, and that this quantization noise variation is specific to the type of encoding used.

Therefore, in an advantageous embodiment:

based on the information of the type of encoding, a variation of the quantization noise is estimated as a function of at least one parameter of the decoded signal, and according to a current value of this parameter in the decoded signal, the quantization noise is estimated in order to determine the filtering function to be applied to the decoded signal having this current parameter value.

It will be understood therefore that the information on the type of compression encoding is a priori information, independent of the characteristics of the signal and that, advantageously, the following may be deduced therefrom:

a variation model of a signal-to-quantization noise ratio, as a function of at least one parameter of the decoded signal, and/or a spectral coloration of the quantization noise (that is to say a spectral variation of the quantization noise as a function of the characteristics of the decoded signal).

In one possible embodiment, the a priori information on the type of compression encoding is obtained during an encoder declaration procedure.

The invention is particularly suited to the situation in which the compression encoding type is an encoding according to the G.711 standard.

A further subject matter of the present invention is a device for processing a signal that is initially compression encoded according to a predetermined encoding type, then decoded. The device comprises:

means for estimating a quantization noise introduced by the compression encoding, based on the decoded signal and information obtained a priori on the type of compression encoding, means for estimating a signal to quantization noise ratio. and means for determining, based on the estimated signal to quantization noise ratio, a filtering function to be applied to the decoded signal in order to apply an estimated quantization noise reduction process.

More generally, the device advantageously comprises means for applying the method described above.

It is advantageous that such a device is incorporated into a decoder, downstream of a decoding unit, as illustrated in FIG. 1 representing a device TBQ of the aforementioned type downstream of the decoding unit DEC. This FIG. 1 will be described in detail below.

A further subject of the present invention is a computer program designed to be stored in the memory of a processing device of the aforementioned type, and comprising instructions for calculating the quantization noise, and parameters of a quantization noise reduction filter, when these instructions are executed by a processor of the processing device.

An advantageous embodiment may consist in providing an instruction set for each type of encoding used and, in each instruction set, in defining a variation of the quantization noise as a function of the decoded signal. Therefore, on receipt of the a priori information, a set of appropriate instructions is selected. With this instruction set:

the quantization noise present in the decoded signal is calculated, and the parameters of the postfilter are calculated in correspondence with this quantization noise in order to limit, or even eliminate, this noise.

The instructions on the variation of the quantization noise may be programmed offline, on the basis of observations (theoretical or experimental according to the exemplary embodiments that will be described below) made on the type of encoding used. The manner, itself, in which these instructions are executed will be described in detail below, with reference to FIGS. 2 and 5 which may then form flow charts of a computer program within the meaning of the invention.

Therefore, the invention proposes a post-processing that is carried out after decoding and that uses a priori information on the characteristics of the quantization operation that the encoder carries out. The type of process (or "process model" according to the above generic terms) which will be chosen to process the signal is independent of the characteristics of the signal itself. Naturally, the process per se (particularly the estimation of the gain function) may depend on the signal, for example on its energy or its power. On the other hand, whether it involves processing a music signal, a speech signal or any other signal (of a harmonic, pulse, etc. nature), the type of process is the same and is based, for example, only on the energy of a received decoded frame. Specifically, it is possible to ascertain in a theoretical manner the characteristics of the quantization noise, particularly as a function of the various families of encoders. Within the meaning of the invention, this information is then used to estimate the magnitudes which are used to define at least one gain function of a noise-reduction unit which occurs downstream of a decoding unit.

Therefore, the invention makes it possible to reduce the quantization noise (and hence the distortion) that a compression encoder of the signal usually introduces applying a quantization operation.

According to one of the advantages that the present invention proposes, it is possible to keep the same encoding/decoding structure without making any modification thereto and yet to ensure a better quality of the decoded signal, and to do so without increasing the quantity of information to be transmitted by the encoder.

According to another advantage, the invention makes it possible to advantageously reduce the quantization noise alone, even in a period of silence, and to do so for any type of signal.

According to yet another advantage, the application of the invention does not cause a conventional noise reduction and therefore does not modify the noise associated with the environment of the capture of the signal.

It will be remembered in particular that the application of the invention makes it possible to reduce, or even eliminate, the quantization noise, without distorting the signal and to do so for any type of signal, simply by using a priori information on the type of encoder used (for example the characteristics of the compression model of the encoder, the characteristics of the quantizer, or other characteristics).

The present invention finds an advantageous application in the field of processing speech and music, and more generally in the processing of the signal, particularly of images, when any encoder introduces a quantization noise.

More generally, the invention applies to all the fields in which there is the need to reduce a quantization noise of a signal.

BRIEF DESCRIPTION OF THE DRAWINGS

Other features and advantages of the invention will appear on examination of the following detailed description and of the appended drawings in which:

FIG. 5 illustrates the steps of an exemplary process in the case of encoding according to the G.711 standard, based in particular on the observations of the variations of FIGS. 3 and 4, FIG. 6 illustrates an example of the signal spectrum (the dashed curve) and of the quantization noise spectrum (the continuous curve) for encoding according to the G.722 standard, FIG. 7 illustrates a waveform example of a speech signal S* (the top curve) and the corresponding signal-to-quantization noise ratio RSB (the bottom curve), for encoding/decoding according to the G.722 standard, FIG. 8 is a cloud of dots illustrating, for each segment of 80 samples, the correlation between the signal-to-noise ratio RSB and the energy of the signal, in an application to encoding/decoding according to the G.722 standard.

DETAILED DESCRIPTION

Figure 1:
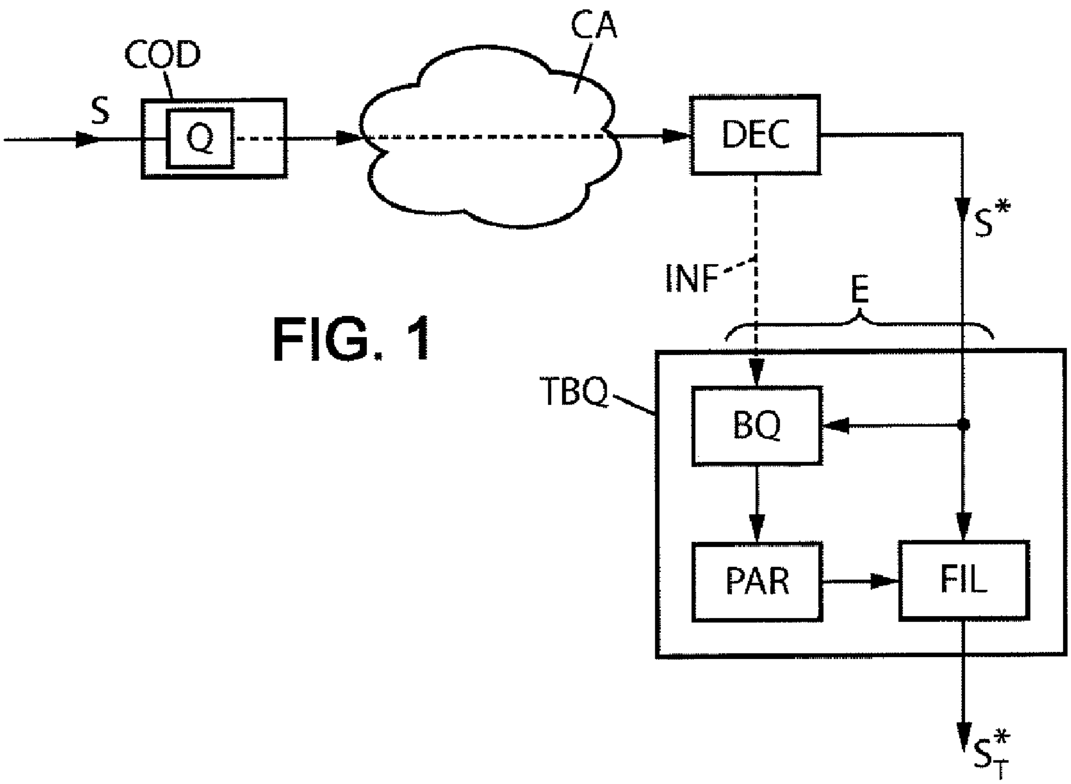
FIG. 1 illustrates schematically the general structure of a processing unit within the meaning of the invention.

Reference is made first of all to FIG. 1 in which a signal S is:

- compression encoded by an encoder COD of known type and applying in particular a quantization operation Q to the signal S,
- transmitted via a transmission channel CA, then
- decoded by a decoder DEC that is the counterpart of the encoder COD.

The signal thus decoded, marked S*, then has a quantization noise which is defined mathematically as a difference (S*−S) relative to the original signal S.

Again referring to FIG. 1, within the meaning of the invention, downstream of the decoder DEC, a quantization noise reduction process unit TBQ is provided in order to eliminate or at least limit the quantization noise in the signal S*.

For this purpose, the unit TBQ comprises at least one input E in order to receive from the decoder DEC information INF on the type of encoding/decoding used, which makes it possible then to choose a noise-reduction processing model to be applied. In particular, based on the signal received and decoded S*, and as a function of the type of encoding/decoding that has been used, the influence of the quantization noise in the received signal S* is estimated. For this purpose, a calculation model is provided for giving an estimate of the quantization noise BQ on the basis of the chosen model and as a function of the received signal S*. This calculation module can typically take the form of a combination of a processor and a working memory (not shown). Based on the estimated quantization noise BQ, the estimated noise BQ is simply processed by applying a conventional filter FIL to the signal S* in order finally to deliver a processed signal $S^*_T$. Emphasis should again be made on the fact that the parameters PAR of the filter FIL applied to the signal S* (for example a gain function for the filtering of the signal) are determined in order to reduce in particular the estimated quantization noise BQ.

Figure 2:
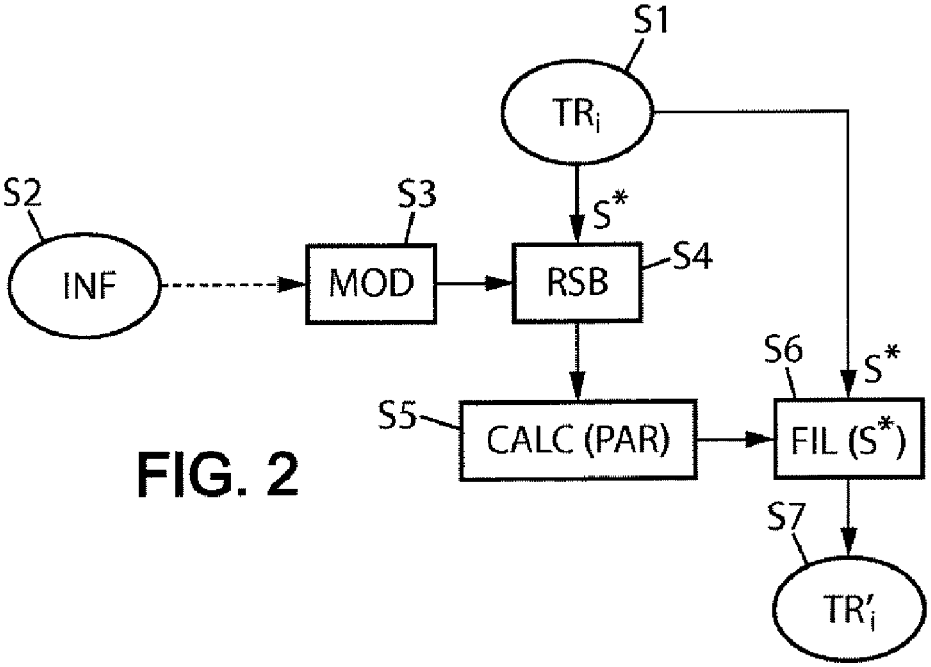
FIG. 2 illustrates schematically the steps of a method within the meaning of the invention.

Specifically, with reference to FIG. 2, based on the information INF received on the type of encoding/decoding used (step S2), a noise-reduction processing model is determined (step S3). It will be seen in the exemplary embodiments described below that the quantization noise reduction model chosen may be different, for example depending on whether the signal has been encoded/decoded according to the G.711 standard or encoded/decoded according to the G.722 standard.

Therefore, when the signal is received in successive blocks (or frames marked TRi in the step S1), a quantization noise level specific to the chosen model is estimated (step S4). As will be seen in the examples below, it is advantageous to estimate the level of quantization noise based on the calculation of the signal-to-quantization noise ratio (marked RSB). This information RSB depends on the decoded signal S*, but also on the type of encoding used. Therefore, the a priori knowledge of the encoding, by obtaining the information INF makes it possible, in combination with certain statistical characteristics of the signal S*, to estimate in this instance the signal-to-quantization noise ratio RSB.

This step S4 therefore requires an a priori knowledge of the type of encoder that has been used, information which can be obtained for example during a procedure for declaring the encoder called "the encoder transaction", that is assumed to be acquired.

The type of encoder, the characteristics of its compression model and of its quantizer Q make it possible to estimate a change in the signal-to-quantization noise ratio, as a function of certain statistical parameters of the signal, such as for example its variance, its power spectral density, or other parameters. This relationship between the signal-to-quantization noise ratio and the statistical parameters of the signal brings into play the laws specific to the encoder that will be described below, for a few exemplary embodiments.

The necessary statistical parameters may be calculated by conventional estimators of magnitude (for example the variance). As a function of these estimates, an estimation of the signal-to-quantization noise ratio may be extrapolated. The estimates may be made without distinction in the time or frequency fields or any other time-frequency field (converted into wavelets for example).

Again with reference to FIG. 2, the next step S5 consists in calculating the parameters of the filter for the reduction of the quantization noise in the received signal S*. Knowing the signal-to-noise ratio makes it possible to deduce therefrom the expression of a quantization noise reduction filter, this filter hereinafter being called the "postfilter" (downstream of the decoder). Specifically it is possible to deduce the expression of a digital filter the purpose of which is to reduce a noise most of whose characteristics are known a priori (its power spectral density for example) and the level of which is determined based on the estimate of the signal-to-quantization noise ratio obtained in the previous step S4. For example, the filter can be calculated in the frequency field and any short-term spectral attenuation technique may be applied (a spectral subtraction, a Wiener filter, or other technique). The calculation of the postfilter in step S5 may be carried out in the time or frequency fields or any other time-frequency field.

Finally, the noise-reduction processing step S6, itself, means in this instance filtering the decoded signal S* via the postfilter calculated in step S5. This step S6 may be carried out in the time or frequency field, depending upon the constraints associated with the application and the field of estimation of the parameters PAR and of the ratio RSB in the previous steps. This finally gives a frame TRi' processed by reduction of the quantization noise in step S7.

Described below is an exemplary embodiment of the invention for encoding/decoding according to the G.711 standard (according to the European law called the "A law").

The conventional digital representation of one-dimensional signals uses a uniform quantization of the samples. Therefore, if the capacity of the quantizer is not exceeded, the signal-to-quantization noise ratio (RSB) depends on the variance $\sigma_x^2$ of the signal, on the saturation levels $x_{max}$ determined by the dynamic range and naturally on the number of bits b used to represent the samples, according to an expression of the following type:

$$RSB = 3\frac{\sigma_x^2}{x_{max}^2}2^{2b}, \text{ or in dB:} \tag{1}$$

$$RSB = 10\log\left(3\frac{\sigma_x^2}{x_{max}^2}2^{2b}\right) = (20\log 2)b + 10\log 3 - 20\log\Gamma[\text{dB}]$$

The magnitude $$\Gamma = \frac{x_{max}}{\sigma_x}$$

represents a parameter called the "load factor" which determines the quality of use by the signal of the quantizer's dynamic range, in which:

- $x_{max}$ is the maximum possible digital amplitude level of a sample according to the chosen quantizer, and
- $\sigma_x$ is the standard deviation of the signal (the square root of the variance) which, for a complete block of samples (or "frame"), can be estimated via the square root of the average power Pm of the signal on this block.

The expression (1) is highly dependent on the value of this parameter Γ. It is noted in particular that the maximum signal-to-noise ratio is obtained for a full-scale signal and that it decreases rapidly if the amplitude of the signal diminishes.

The limits at low bit rates of the uniform quantization law led to developing a quantization law in which the signal-to-quantization noise ratio was almost independent of the signal variance for a broad dynamic range of signals. This is indeed what the logarithmic quantization law achieves for encoding according to the G.711 standard (called the "A law" in Europe or the "μ law" in North America).

The A law in use in Europe is defined by an expression dependent on the value x of the quantized sample, as follows:

$$F(x) = \begin{cases} \dfrac{A|x|/x_{max}}{1+\ln A}\text{sgn}x, & 0 \le |x|/x_{max} < A^{-1} \\ x_{max}\dfrac{1+\ln(A|x|/x_{max})}{1+\ln A}\text{sgn}x, & A^{-1} \le |x|/x_{max} \le 1 \end{cases} \tag{2}$$

Figure 3:
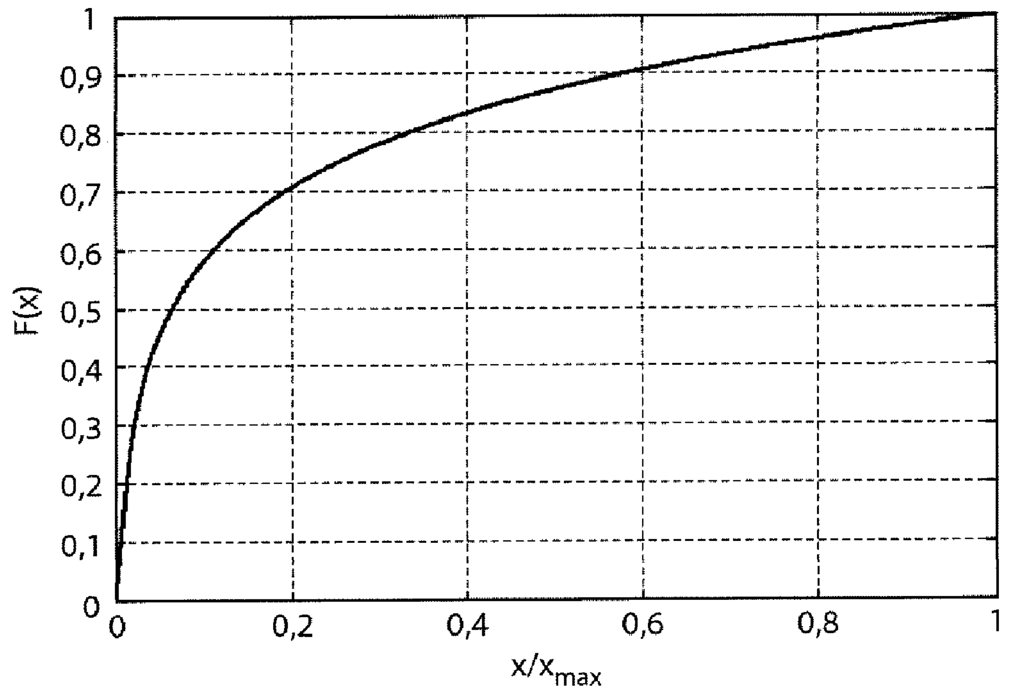
FIG. 3 illustrates a variation of the amplitude-compression law (called the "A law"), in an encoding according to the G.711 standard in order to illustrate an exemplary embodiment of the invention.

With reference to FIG. 3, the first variation of the compression law $0\leqq|x|/x_{max}<A^{-1}$) is linear, engenders a uniform quantization law and is called hereinafter "uniform variation", while the second variation of the compression law ($A^{-1}\leqq|x|/x_{max}\leqq 1$) is logarithmic, and is called hereinafter "logarithmic variation".

The European law uses a value of A=87.56 (which numerically satisfies the equation A/(1+1 nA)=16).

Based on these observations, it is possible to calculate the signal-to-quantization noise ratio for a compression according to the A law, as follows.

For low-intensity signals (the uniform portion of the compression law), the A law provides a 10 log(A/(1+1 nA)) signal-to-quantization noise ratio that is greater (in dB) than that obtained by a uniform quantization on the same number of levels, the expression of which is given by:

$$RSB_{unif} = (20\log 2)b + 10\log 3 + 10\log[A/(1+\ln A)] - 20\log(\Gamma)[\text{dB}]$$

$$RSB_{unif} \approx 6.02b + 4.77 + 10\log[A/(1+\ln A)] - 20\log(\Gamma)[\text{dB}]$$

$$RSB_{unif} \approx 64.97 - 20\log(\Gamma)[\text{dB}] \text{ for } b=8 \tag{3}$$

For signals of greater amplitude (the logarithmic portion of the compression law), the signal-to-quantization noise ratio is constant and equal to 38.16 dB (for b=8 bits):

$$RSB_{log} = (20\log 2)b + 10\log 3 - 20\log(1+\ln A)[\text{dB}]$$

$$RSB_{log} \approx 6.02b - 10[\text{dB}]$$

$$RSB_{log} \approx 38.16 \text{ dB for } b=8 \tag{4}$$

Figure 4:
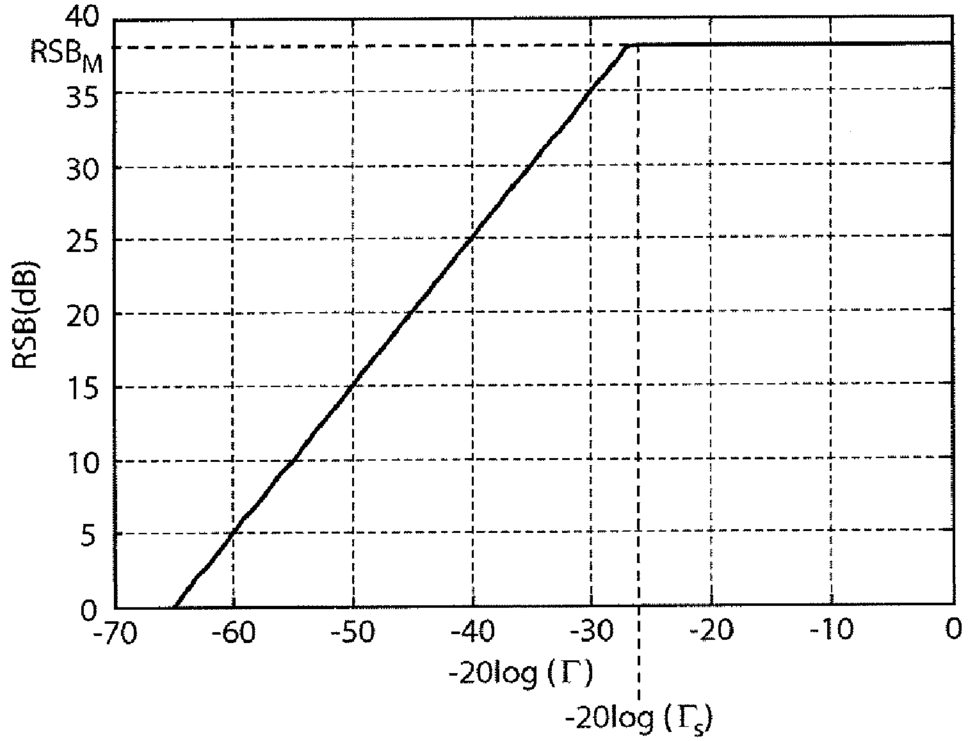
FIG. 4 illustrates the variation in the signal-to-quantization noise ratio RSB as a function of the load factor, this variation being drawn from the variation illustrated in FIG. 3.

FIG. 4 represents the change in the signal-to-quantization noise ratio RSB for an A law with b=8 bits. Immediately identified are:

- a first increasing portion, corresponding to the uniform variation of the compression law, and
- a next portion, that is constant, corresponding to the logarithmic variation of this law.

In order to process the reduction of the quantization noise introduced by encoding according to the G.711 standard, two items of information are used in this instance:

the signal-to-quantization noise ratio that is given by the equations (3) and (4) above, and the well-known information according to which this noise is "white" for this type of encoding.

Applying the quantization noise reduction process is based on the use of these items of a priori information. It requires in particular producing an estimate of the load factor Γ, the parameter on which the power of the quantization noise depends, as follows.

With reference to FIG. 5, the average power Pm of a current block TRi (step S52) is estimated and, from there, the load factor Γ, varying as the inverse of the square root of the average power (step S53). It is considered specifically that the numerator $x_{max}$ of the load factor is constant in this instance (at a constant saturation level). In the test T54, the value found for the load factor Γ is compared with that of a threshold $\Gamma_s$ defining the point of inflection of the compression law (FIG. 4), as follows:

if the load factor Γ is such that $-20\cdot\log(\Gamma)>-20\cdot\log(\Gamma_s)=38.16-64.97\sim=-27$ dB (arrow o at the output of the test T54), then the signal-to-quantization noise ratio is constant and is $RSB_M\sim=+38$ dB (the plateau in FIG. 4), as fixed in the step S55, otherwise (arrow n at the output of the test T54), then the signal-to-quantization noise ratio RSB can be calculated according to a linear variation as a function of the load factor drawn from the equation (3):

$RSB=f(\Gamma)=65-20\log(\Gamma)$ [dB], as fixed in the step S56.

The gain function is then evaluated (step S57) for the application of the postfilter (step S58). As a purely illustrative example, a Wiener filter may be provided as a gain function g(RSB). The expression of the Wiener filter $f_w$ may be given by the value of the signal-to-quantization noise ratio RSB calculated previously, taking account naturally of its frequency dependence with:

$g(RSB)=f_w=RSB/(RSB+1)$, where, in this instance, the value RSB is not expressed in dB but in natural value.

Provision can advantageously be made to reduce the noise-reduction process in particular for signals with a low signal-to-quantization noise ratio, therefore with a low amplitude level (for load factors such as $-20.\log(\Gamma)<-50$ dB in FIG. 4), by optionally providing:

a thresholding of the postfilter, and/or a voice activity detector for speech signals (with a lighter processing of quantization noise reduction during the periods of speech inactivity).

It is indicated that a variant of the process shown here is to reduce the quantization noise, sample by sample, rather than a process by successive blocks. In this case, the load factor is given directly by the level of amplitude of the sample (inverse of the square root of the amplitude) and the rest of the process is similar to that explained above.

Another possible application of the invention to a different encoding type, in this instance encoding according to the G.722 standard, is now described.

ITU-T G.722 encoding, standardized in 1988 for audio-conference applications on 64 kbit/s digital channels, is still very widely used. It is a three-bit hierarchical encoding/decoding: 64, 56 and 48 kbit/s. The signal is divided into two subbands by a filter called QMF (for "Quadrature Mirror Filter"). The two bands obtained are encoded with an ADPCM (for "Adaptive Differential Pulse Code Modulation") encoder.

The high band is encoded on 2 bits per sample. The difference between the three bit rates comes from the low band which is encoded on 6 bits per sample for the highest bit rate, but it is possible to reserve the last or the last two bits for data transmission.

The quality of the highest bit rate is very good, however the encoding noise becomes very audible and annoying for the lowest bit rate of 48 kbit/s. The quantization noise reduction process within the meaning of the invention can be advantageously applied in this case.

Already, the characteristics of the quantization noise can be effectively estimated based on the decoded signal. As illustrated in FIG. 6, the quantization noise spectrum (the solid-line curve) is always flat, irrespective of the signal spectrum (curve in dashed lines). The signal-to-quantization noise ratio depends on the average power of the signal and its nature. In FIG. 7, it can be seen that the signal-to-quantization noise ratio (RSB) is well correlated with the average power of the signal S*. In the example shown, the ratio RSB has been estimated on segments of 80 samples (5 ms for a sampling frequency of 16 kHz).

The representation in the form of clouds of dots in FIG. 8 even better illustrates the correlation between the average power of the signal (the axis of the abscissas) and the signal-to-quantization noise ratio (the axis of the ordinates), calculated by segments of 80 samples.

From this observation, it is possible to deduce a first simple rule for estimating the ratio RSB as a function of the average power $P_{moy}$ of the segment (the correlation straight line shown in dashes in FIG. 8), given by:

$$RSB=P_{moy}-CST \text{ [dB]} \quad (5)$$

where CST is a constant which, in the example of FIG. 8, is approximately 10 dB.

It will be understood from this expression that the average power of the noise, determined experimentally here, is constant CST=10 dB, and this is so irrespective of the average power of the signal, so that the ratio RSB does in fact increase with the average power of the signal.

The best estimate of the signal-to-quantization noise ratio RSB is obtained for low signal levels, that is to say when the ratio RSB is low (and hence when the noise is the most audible). However, certain segments have dots situated well below the dashed line and the use of this simple rule is then suboptimal. It has however been observed that these zones correspond to high ratios RSB where the quantization noise is already probably masked by the effective signal.

In a general manner, it has been observed that the process within the meaning of the invention applied here nevertheless achieves an advantageous reduction in quantization noise.

Figure 9:
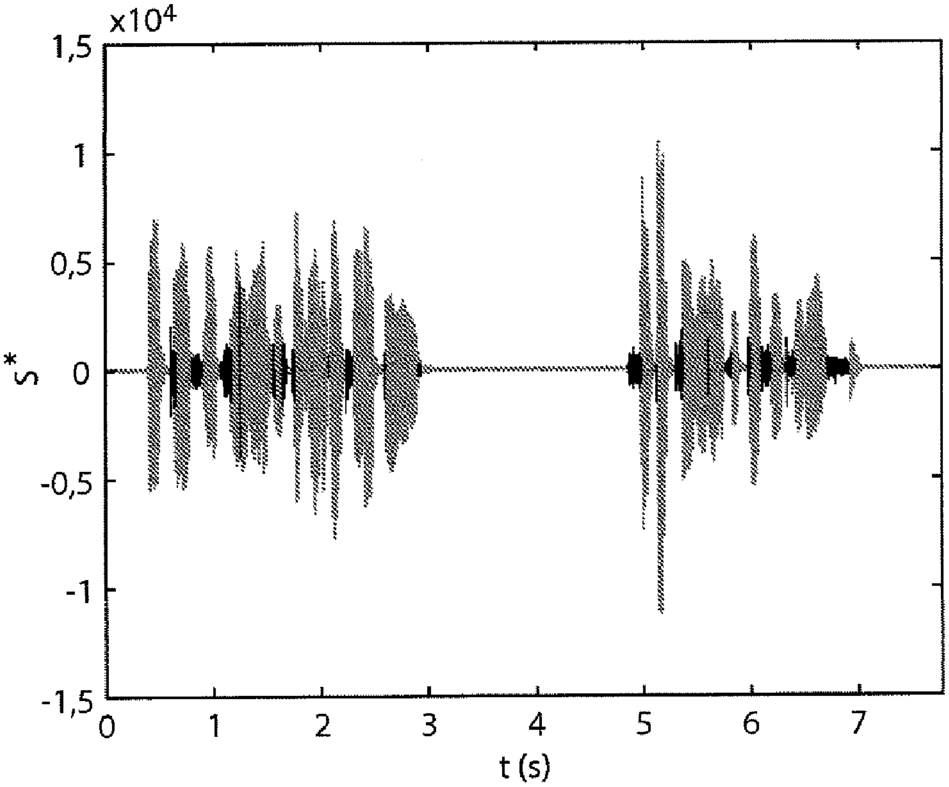
FIG. 9 shows the signal segments (in black) in which the estimation error of the signal-to-quantization noise ratio RSB is greater than 6 dB while the ratio RSB is less than 25 dB, in the application to encoding/decoding according to the G.722 standard, FIG. 10 repeats the cloud of dots representing, for each segment, the energy of the noise as a function of the energy of the signal, illustrating in this instance the estimate of the noise level (dotted and dashed line), the zone in which the error of the estimate is less than 6 dB (dashed lines), and the delimitation for which the ratio RSB is greater than 25 dB (the solid line).

If the simple rule of the equation (5) is used, FIG. 9 represents in black on a grey background the zones of the signal in which the ratio RSB estimation error is greater than 6 dB and the ratio RSB itself is less than 25 dB, that is to say the zones of the signal in which the estimator under-estimates the quantization noise, which causes the quantization noise reduction process to be less effective. It is possible however to note that these zones correspond to unvoiced signal segments, for which the quantization noise is less of a drawback because of the intrinsically noisy nature of the signal.

Figure 10:
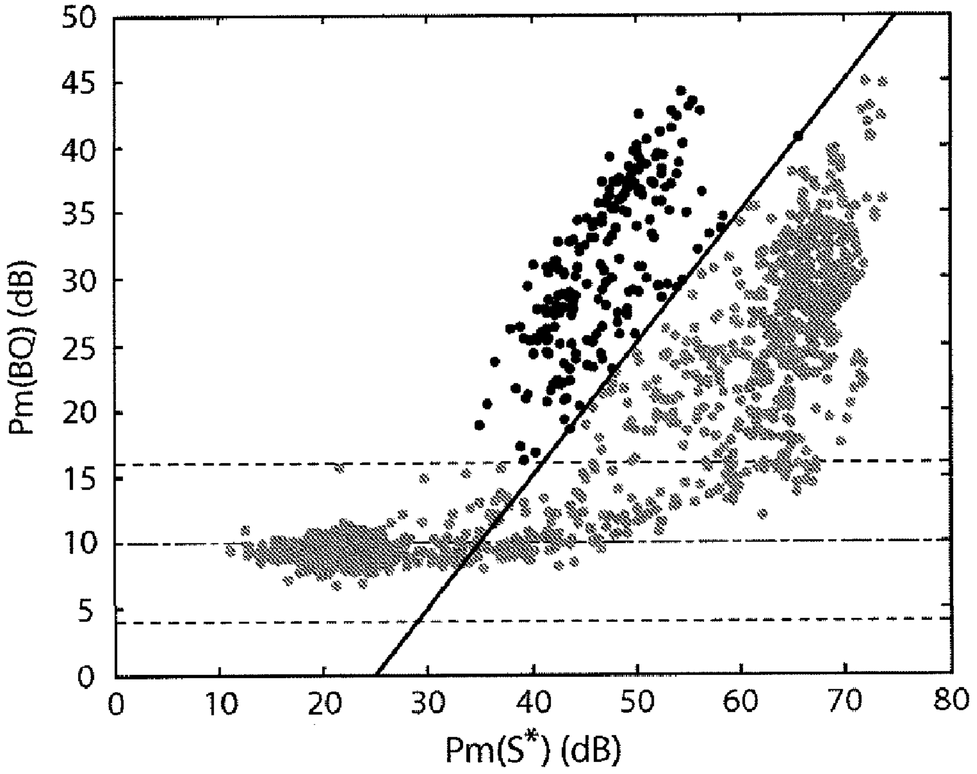

FIG. 10 shows a diagram of noise power relative to the signal power, according to the empirical equation (5). The dot-and-dash line represents the estimate of the noise power. The dashed lines delimit the zone in which the estimation error is lower than 6 dB. Below the solid line, the ratio RSB is greater than 25 dB. The black dots (relative to the other grey dots) correspond to the black segments of FIG. 9.

This shows that a very simple estimate of the ratio RSB based only on the energy of the decoded signal can give good results for ADPCM encoding/decoding. The estimate of the ratio RSB may be further refined by taking account, for example, of the prediction gain of the ARMA (autoregressive) filters which are used in the G.722 decoder.

Knowing the spectral shape of the quantization noise and its energy, it is possible effectively to apply the quantization noise reduction process of the invention for this type of encoding/decoding. This example is very evidently valid for the other types of encoding/decoding of the same family such as those of the G.726 or G.727 standards.

Naturally, the present invention is not limited to the embodiment described above as an example; it extends to other variants.

Therefore, it has been shown above that an advantageous application of the invention may, for example, aim to reduce the quantization noise of an ITU-G.711 standard encoder using the properties of the quantization law applied, in particular according to the A law in Europe. Specifically, in this application, the quantization noise is white and it is possible to estimate the signal-to-quantization noise ratio and, from that, a gain function which makes it possible to reduce this noise. An object of an advantageous application of the invention is then the reduction of quantization noise in the process to extend the G.711 encoder to a widen band (ITU-T SG16, G.711WB).

However, the process in the case of the A law has been given above as an example. Similarly, the example of the μ law could have been described (the portion of the G.711 standard applied in the United States).

More generally, the invention applies to any type of encoding/decoding given that its intrinsic characteristics are known.

The invention claimed is:

1. A method for processing a signal, said signal having been compression encoded according to a predetermined encoding type, subject to application of a quantization operation, and then decoded, said method comprising:

estimating quantization noise introduced by the compression encoding based on the decoded signal and information obtained a priori relating to the type of compression encoding, estimating signal to quantization noise ratio, and determining, based on the estimated signal to quantization noise ratio, a filtering function to be applied to the decoded signal in order to apply an estimated quantization noise reduction process.

2. The method as claimed in claim 1, wherein:

a quantization noise reduction model is chosen based on said information, and a quantization noise reduction process is applied to the decoded signal according to the chosen model.

3. The method as claimed in claim 2, wherein, on the basis of the chosen model, said quantization noise introduced by the compression encoding is estimated.

4. The method as claimed in claim 1, wherein:

based on said a priori information, a variation of the quantization noise is estimated as a function of at least one parameter of the decoded signal, and according to a current value of said parameter in the decoded signal, the quantization noise is estimated in order to determine the filtering function to be applied to the decoded signal having said current parameter value.

5. The method as claimed in claim 1, wherein deduced from said a priori information is a variation model of a signal-to-quantization noise ratio, as a function of at least one parameter of the decoded signal.

6. The method as claimed in claim 5, wherein a spectral coloration of the quantization noise is deduced from said a priori information and account is also taken of said spectral coloration in order to determine the filtering function to be applied to the decoded signal.

7. The method as claimed in claim 1, wherein said a priori information is obtained during an encoder declaration procedure.

8. The method as claimed in claim 1, wherein the compression encoding type is an encoding according to the G.711 standard.

9. A device for processing a signal that is initially compression encoded according to a predetermined encoding type, then decoded, said device comprising:

means for estimating quantization noise introduced by the compression encoding, based on the decoded signal and information (INF) obtained a priori relating to the type of compression encoding, means for estimating signal to quantization noise ratio, and means for determining, based on the estimated signal to quantization noise ratio, a filtering function to be applied to the decoded signal in order to apply an estimated quantization noise reduction process.

10. The device as claimed in claim 9, incorporated into a decoder, downstream of a decoding unit.

11. A computer readable medium comprising a computer program, designed to be stored in the memory of a device for processing a signal that is initially compression encoded according to a predetermined encoding type, then decoded, said program comprising instructions for:

estimating quantization noise introduced by the compression encoding, based on the decoded signal and information obtained a priori relating to the type of compression encoding, estimating signal to quantization noise ratio, and calculating parameters of a filter for reducing the estimated quantization noise, when these instructions are executed by a processor of the processing device.

* * * * *